United States Patent
Sullivan et al.

(10) Patent No.: US 8,452,567 B1
(45) Date of Patent: May 28, 2013

(54) TEST RECIPE DISTRIBUTION METHOD AND SYSTEM

(75) Inventors: Michael Sullivan, Cleveland, OH (US); Jerold A. Williamson, Twinsburg, OH (US)

(73) Assignee: Keithley Instruments, Inc., Cleveland, OH (US)

( * ) Notice: Subject to any disclaimer, the term of this patent is extended or adjusted under 35 U.S.C. 154(b) by 571 days.

(21) Appl. No.: 12/134,649

(22) Filed: Jun. 6, 2008

(51) Int. Cl.
*G06F 19/00* (2011.01)
*G06F 11/00* (2006.01)

(52) U.S. Cl.
USPC ............................................. 702/122; 714/42

(58) Field of Classification Search
USPC ..................... 702/122; 714/718, 42
See application file for complete search history.

(56) References Cited

U.S. PATENT DOCUMENTS 6,892,328 B2 * 5/2005 Klein et al. ...................... 714/42
2003/0234659 A1 * 12/2003 Zieleman ...................... 324/765

OTHER PUBLICATIONS

TETworks, The Open Group, TETware White Paper, "Managing Distributed Testing", webpage http://tetworks.opengroup.org/Wpapers/distributed_whitepaperhtm, May 20, 2008, Copyright © The Open Group 1995-2006, pp. 1-2.

Peterson, Stephen, non-published U.S. Appl. No. 11/763,041, filed Jun. 14, 2007.

* cited by examiner

*Primary Examiner* — Eliseo Ramos Feliciano
*Assistant Examiner* — Manuel Rivera Vargas
(74) *Attorney, Agent, or Firm* — Pearne & Gordon LLP

(57) ABSTRACT

Provided is a method and system for distributing a test recipe to a tester for conducting a test to determine if a device under test operates as designed. The method includes storing an active test recipe in an active memory in local communication with the tester, and initiating the test of the device under test to be performed by the tester according to a parameter included in the active test recipe stored in the active memory. A second parameter included in a second test recipe is received by the tester while conducting the test of the device under test according to the parameter included in the active test recipe. The method further includes storing the second parameter in a buffer memory in local communication with the active memory, and initiating a transfer of the second parameter from the buffer memory to the active memory. After initiation of the transfer of the second parameter to the active memory, a subsequent test to be performed by the tester according to the second parameter included in the second test recipe is initiated.

13 Claims, 3 Drawing Sheets

TEST RECIPE DISTRIBUTION METHOD AND SYSTEM

BACKGROUND OF THE INVENTION

1. Field of the Invention

The present invention is directed generally toward a method and system for updating test instruments and, more specifically, to a method and system for distributing test recipes to a plurality of different test instruments with minimum disruption of testing operations.

2. Description of Related Art

Electronic device manufacturers typically produce mass quantities of integrated circuits and other such electronic circuit components that will be included in electronic devices eventually sold to end users. Due to the volume of electronic components manufactured, several production testing devices are situated throughout the production floor to conduct tests on a suitably large sample of the electronic components to provide reasonable assurance that the electronic components as a whole function as designed. Depending on the extent of the tests performed on each electronic component the time required to perform said tests in some production environments commonly ranges from about ten (10) minutes to sixty (60) minutes, and even longer.

Each testing device includes the required hardware to interface with the electronic component to be tested, referred to herein as a device under test, and measure the value of an electrical property of the device under test that indicates whether the device under test operates as designed. Each testing device is also provided with what is commonly referred to as a test recipe, which defines the parameters and steps of the tests to be performed on each device under test. The test recipe is stored locally within a computer-readable memory provided to the testing device, allowing the testing device to readily gain access to the test recipe for execution with minimal delays and without relying on external influences such as communications from other networked components. However, the device under test can change to a different electronic component, standards that an existing device under test must meet to pass the test can change over time, for example. Such circumstances occasionally require an existing test recipe stored by the testing devices to be updated, or a new test recipe to be communicated to the testing devices.

Conventionally, to create an updated or new test recipe developers develop the test recipes on a workstation and place the updated or new test recipe in a queue of test recipes to be delivered to each of the testing devices. However, delivery of the updated or new test recipe from the queue to the local memory provided to each of the testing devices is not started until a test already being performed on a device under test when the test recipe is placed in the queue is completed. Only after the test in progress is completed can delivery of the test recipe in the queue to the local memory of the testing devices commence.

Test recipes, however, can be large in size, often times reaching several megabytes or more, particularly when there are more than a single test recipe in the queue awaiting delivery to the testing devices. Transmitting files of this size to the local memory of even one of the testing devices can be very time consuming, often exceeding several minutes to complete. Further, all testing devices must be provided with the same test recipes to ensure uniform test results are returned by all of the testing devices. When delivery of new or updated test recipes to a testing device is scheduled, delivery of those test recipes commences once the testing device has become idle. Subsequent tests to be conducted by the testing device are delayed until all such test recipes have been delivered to that testing device. The several minutes of delay multiplied by the number of testing devices results in lengthy downtimes across the collection of testing devices often exceeding several hours in length. Moreover, when developers place updated or new test recipes in the queue to be delivered to the testing devices, test recipes can only be placed in the queue one at a time. If one developer is placing several test recipes in the queue for delivery, then other developers who also want to place test recipes in the queue must wait until the first developer's test recipes are all placed in the queue before placing their test recipes in the queue. This creates a line of traffic to place all of the test recipes in the queue and adds further delays to the test recipe development and delivery process.

Accordingly, there is a need in the art for a method and system for delivering test recipes to a testing device for testing electronic components. The method and system can minimize downtime of the testing device required to update and deliver new test recipes to a local memory, and can optionally commence a test operation on a device under test while awaiting delivery of, or completion of a delivery of a test recipe.

BRIEF SUMMARY OF THE INVENTION

According to one aspect, the present invention provides a tester for conducting a test of a device under test according to a parameter included in an active test recipe. The tester includes a test instrument for evaluating an electric signal transmitted by the device under test during the test according to the parameter included in the active test recipe to determine if the device under test operates as designed, and an active memory in local communication with the tester for storing the parameter included in the active test recipe. A network adaptor is provided for communicating with a test recipe database over a network to receive a second parameter included in a second test recipe. A buffer memory in local communication with the active memory receives and stores the second parameter included in the second test recipe while the test conducted according to the parameter in the active test recipe is underway. A subsequent test conducted by the tester is performed according to the second parameter stored in the active memory.

According to another aspect, the present invention provides a method of distributing a test recipe to a tester that conducts a test to determine if a device under test operates as designed. The method includes storing an active test recipe in an active memory in local communication with the tester, initiating the test of the device under test to be performed by the tester according to a parameter included in the active test recipe stored in the active memory, and receiving a second parameter included in a second test recipe while conducting the test of the device under test according to the parameter included in the active test recipe. The second parameter is to be stored in a buffer memory in local communication with the active memory, and a transfer of the second parameter from the buffer memory to the active memory is initiated. After initiation of the transfer of the second parameter to the active memory, the method includes initiating a subsequent test to be performed by the tester according to the second parameter included in the second test recipe.

BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

DETAILED DESCRIPTION OF ILLUSTRATIVE EMBODIMENTS

Figure 1:
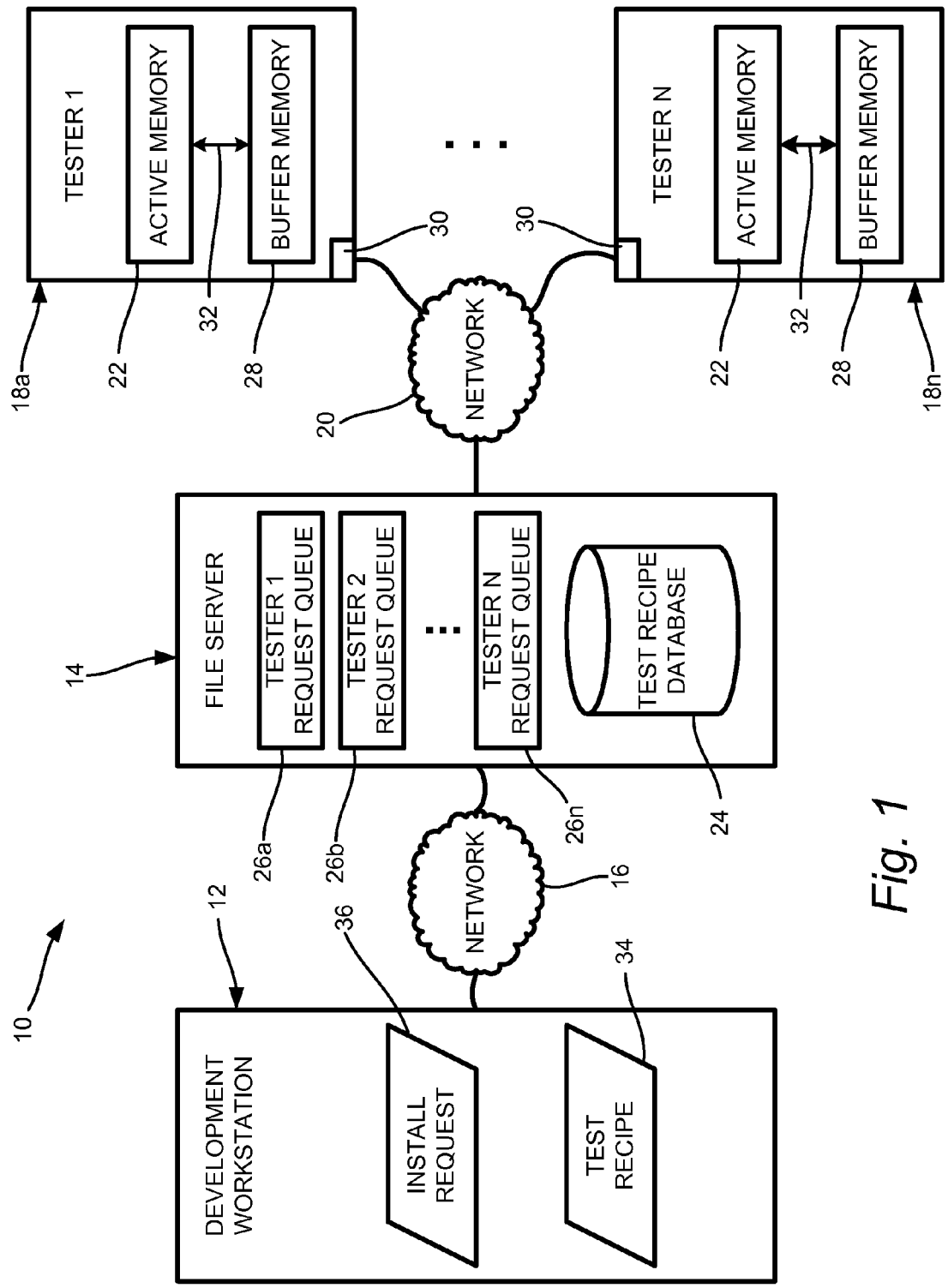
FIG. 1 shows a block diagram illustrating an embodiment of a test system according to the present invention.

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

It is also to be noted that the phrase "at least one of" followed by a plurality of members herein means one of the members, or a combination of more than one of the members. For example, the phrase "at least one of a first widget and a second widget" means in the present application: the first widget, the second widget, or the first widget and the second widget. Likewise, "at least one of a first widget, a second widget and a third widget" means in the present application: the first widget, the second widget, the third widget, the first widget and the second widget, the first widget and the third widget, the second widget and the third widget, or the first widget and the second widget and the third widget.

FIG. 1 shows a block diagram of a test system 10 according to an illustrative embodiment of the present invention. The test system 10 shown in FIG. 1 includes a development workstation 12 in communication with a file server 14 over a network 16. A plurality of testers 18a . . . 18n are also in communication with the file server 14 over a network 20.

The networks 16, 20 are shown as separate networks 16, 20 on opposite sides of the file server 14 to clearly illustrate network communications. According to such a network topology, the network 16 between the development workstation 12 and the file server 14 can optionally be a local area network ("LAN"), such as a private network that is commonly found in an office setting interconnecting computer workstations to various peripheral resources such as printers, scanners, servers, and the like. The LAN is separated from a wide area network ("WAN") such as the Internet by a firewall (not shown), and optionally other such security components. Each of the networks 16, 20 in FIG. 1 can independently be selected as a LAN or a WAN.

According to alternate embodiments, the networks 16, 20 can be combined into a single network, either a LAN or WAN, of which the development workstation 12, file server 14 and testers 18a . . . 18n all form a part of Examples of such combined networks include what is commonly referred to as a hub-and-spoke arrangement where a router, switch or other suitable hub forms the central communication node of the network to which the development workstation 12, file server 14 and testers 18a . . . 18n are all operatively coupled. Thus, communications between the network components is routed through the central hub before being transmitted to the other network components. Other suitable network topologies that can facilitate transmission of electronic data between the development workstation 12, file server 14 and testers 18a . . . 18n are also within the scope of the present invention. For example, one or more of the file server 14, development workstation 12 and a tester 18 can optionally form portions of a common unit. There can also optionally be a plurality of development workstations 12 in communication with the networks 16, 20.

The development workstation 12 can be a computer including a central processing unit including a microprocessor such as those manufactured by Intel® and Advanced Micro Devices®, for example, to execute instructions defined by computer-readable logic; volatile memory such as random-access memory ("RAM"); and a non-volatile memory such as a solid state or magnetic hard disk drive ("HDD") storing an operating system such as Microsoft® Windows® or Vista®, UNIX®, Linux, etc. . . . to coordinate interactions between the various components of the development workstation 12. A bus system provides one or more communication channels along which electronic signals are communicated between the various components of the development workstation 12, and an input/output interface ("I/O interface") facilitates and optionally translates signals input and output between the development workstation 12 and peripheral components such as a keyboard, mouse, printer and the like. One or more suitable network adaptors, such as a 10/100 Base-T Ethernet adaptor, and IEEE 802.1x wireless transceiver, for example, can be included as part of the I/O interface to enable communication of data between the development workstation 12 and the network 16.

The development workstation 12 can optionally include a compiler stored in the non-volatile memory for converting source code input by a developer to the development workstation 12 into object code that can be executed by a microprocessor to execute the desired instructions embodied by the object code. The source code, the object code, a combination thereof, or any portion thereof forms a test recipe that includes one or more parameters of a test to be conducted by one or more of the testers 18a . . . 18n on a device under test ("DUT") as described in detail below. As used herein, a parameter can be any information such as an electric quantity, time, or other condition included in a test recipe that will affect a test conducted by one or more of the testers 18a . . . 18n. According to alternate embodiments, the compiler can be stored in a computer-readable memory provided to the file server 14, or the testers 18a . . . 18n to compile the source code to build the test recipe files including the computer-readable logic governing aspects of a test to be conducted on the DUT. For such embodiments the source code is converted and the object code assembled on the file server 14 or testers 18a . . . 18n, respectively. For example, the source code forming the newly-developed test recipe can be compiled into the object code after being stored in the buffer memory 28 or active memory 22.

A test recipe, as the name suggests, is a source code, object code, any other data file, or any combination thereof including the instructions to be executed by the testers 18a . . . 18n in testing a DUT. The test recipe can include one or more parameters of the test to be conducted, such as a target voltage, current, impedance, power, frequency, etc. . . . to be exhibited by the DUT during a test conducted by the testers 18a . . . 18n to assess whether the DUT is functioning as designed.

Similar to the development workstation 12, the file server 14 is a computer in communication with the development workstation 12, testers 18a . . . 18n, and other network members via the networks 16, 20. The file server 14 provides a networked location for the shared storage of computer-readable files such as the test recipes, install requests and other electronic files that can be transmitted over the networks 16, 20. Like the development workstation 12 the file server 14 includes a central processing unit including a microprocessor, to execute instructions defined by computer-readable logic; volatile memory such as RAM; and a non-volatile memory such as a solid state or magnetic HDD. The file server 14 also includes an operating system to coordinate interactions between the various components of the server 14, and its interaction with other networked devices. A bus system provides one or more communication channels along which electronic signals are communicated between the various components of the file server 14, and an I/O interface facilitates and optionally translates signals input and output between the file server 14 and peripheral components such as a keyboard, mouse, printer and the like. One or more suitable network adaptors, such as a 10/100 Base-T Ethernet adaptor, and an IEEE 802.1x wireless transceiver, for example, can be included as part of the I/O interface to enable communication of data between the file server 14 and the networks 16, 20.

The file server 14 can include computer-accessible memory that is optionally divided into sectors or other portions for storing various data. As shown in FIG. 1, the file server 14 stores a shared test recipe database 24 and a plurality of install request queues 26a . . . 26n, one dedicated for each tester 18a . . . 18n, respectively, on the computer-readable medium. The test recipe database 24 includes test recipes developed with the development workstation 12 to be installed on each of the testers 18a . . . 18n to add new tests to be conducted on a DUT, or to supplement or otherwise update existing test recipes stored in the active memory 22 of the testers 18a . . . 18n. Once a newly-developed and/or updated test recipe is stored in the test recipe database 24 to be transmitted to the testers 18a . . . 18n, an install request can be placed in the install request queue 26a . . . 26b for each tester 18a . . . 18n to which the newly-developed test recipe is to be transmitted. The testers 18a . . . 18n can each independently conduct periodic inquiries of their respective install request queues to determine if a new or updated test recipe is awaiting transmittal from the test recipe database 24 to the testers 18a . . . 18n. The terms "newly-developed test recipe" and "updated test recipe" are used interchangeably herein to refer to a test recipe, whether an update or upgrade to an existing test recipe or a new test recipe, that has been developed and is ready to be transmitted to the testers 18a . . . 18n.

Each of the testers 18a . . . 18n includes at least one, and optionally two or more test instruments for evaluating an electric or other type of signal transmitted by the DUT during a test being conducted by each tester 18a . . . 18n on a respective DUT according to one or more parameters included in an active test recipe to determine if the DUT operates as designed. The DUT can be an integrated circuit or any other type of electric circuit, a biocircuit, a photonic circuit, quantum technology, and the like to be tested to ensure its functionality satisfies predetermined design criteria. The test instrument(s) may be, for example, a voltmeter, ammeter, source-measure unit, ohmmeter, inductance meter, capacitance meter, frequency meter, as well as any other electrically operated measurement instrument. Each of the test instruments provided to the testers 18a . . . 18n are not necessarily the same kind of instrument, but can include a plurality of different test instruments suitable to make the desired measurements during testing of the DUT. In addition, one or more of the instruments may incorporate a source for energizing, or otherwise stimulating for testing purposes at least a portion of the DUT. The testers 18a . . . 18n can each optionally also include a microprocessor, to execute instructions defined by computer-readable logic stored in the active memory 22 to conduct a test of the DUT, and control other aspects of the testers 18a . . . 18n. The testers 18a . . . 18n can also optionally include components similar to the development workstation 12 common to personal computers.

By providing a plurality of testers 18a . . . 18n, a separate DUT can be provided to each of the testers 18a . . . 18n for substantially simultaneous testing thereof, and as a result production can be maximized. Each tester 18a . . . 18n is provided with suitable hardware and optionally software components enabling the testers 18a . . . 18n to interface with their respective DUTs to conduct the desired tests defined by the test recipes.

During the test conducted by each tester 18a . . . 18n the DUT is at least partially energized by a source and an electric signal transmitted by the respective DUTs in response is evaluated by the testers 18a . . . 18n. The source can be provided to the testers 18a . . . 18n and can deliver electric energy to the DUT. According to alternate embodiments, however, the source can be an on-board power supply such as a battery provided to the DUT, a light source that emits light energy to be converted by a solar cell provided to the DUT, or any other source that can energize or stimulate the DUT for testing purposes. The electric signal transmitted by the DUT can be compared to a standard, or otherwise evaluated to determine whether one or more properties of the electric signal transmitted by the DUT falls within a range of acceptable values for the conditions under which the DUT was energized. If the one or more properties of the electric signal transmitted by the DUT does fall within the acceptable range of values then it is determined that the DUT functions as designed.

The active memory 22 is provided in local communication with each tester 18a . . . 18n for storing the one or more parameters included in an active test recipe. With the active memory 22 in local communication with the testers 18a . . . 18n, the data from the active memory 22 can be accessed by the testers 18a . . . 18n without further communication over the networks 16, 20. In other words, the active memory 22 is a computer-readable medium that is local relative to the testers 18a . . . 18n, storing the one or more parameters of the current test that the testers 18a . . . 18n are currently programmed to conduct. Thus, the test recipe, or at least the parameters included in the test recipe stored in the active memory 22 dictate the test to be conducted when testing of the DUT by the testers 18a . . . 18n is initiated.

A buffer memory 28 is also provided in local communication with the active memory 22 such that large computer-readable files can be quickly transferred from the buffer memory 28 to be stored in the active memory 22. The buffer memory can receive another test recipe, including at least a second parameter that is different from a parameter then being utilized by the tester 18a . . . 18n to conduct a test. For example, tester 18a initiates a test of a DUT according to one or more first parameters loaded in the active memory 22 at a time when the test to be conducted by the tester 18a is initiated. While this test is underway, and without disrupting the progress of that test, it is determined that another test recipe including one or more second parameters, which are different than the first parameters, are to be transmitted to and stored in the active memory 22 for conducting a subsequent test according to the one or more second parameters. The active memory 22 is in use while the current test is underway utilizing the first parameters, and storage of the second parameters in the active memory 22 is restricted, and must be delayed until the active memory 22 is no longer in use by the tester 18a to conduct the test. While the active memory 22 is in use, or while the tester 18a . . . 18n is idle, transmission of the test recipe including the one or more second parameters from the test recipe database 24 to be stored in the buffer memory 28 is initiated. A network adaptor 30 is provided to each tester 18a . . . 18n, allowing tester 18a to communicate with the test recipe database 24 over the network 20 to receive the one or more second parameters included in the second test recipe. When the active memory 22 of tester 18a is no longer in use, such as when the current test utilizing the one or more first parameters is completed, the one or more second parameters of the second test recipe are transferred over a local communication channel 32 from the buffer memory 28 to the active memory 22. The next test of a DUT by the tester 18a initiated once the one or more second parameters is transferred to the active memory will be conducted utilizing those one or more second parameters.

The active memory 22 and the buffer memory 28 can be separate memory components such as HDDs, flash memories, optical computer-readable media, and the like provided to the testers 18a . . . 18n, or can be separately partitioned from a common memory component. Further, the active memory 22, the buffer memory 28, or both the active memory 22 and the buffer memory 28 can include a plurality of such memory components, wherein the active memory 22 and/or buffer memory 28 are split across two or more of the memory components. However, both the active memory 22 and the buffer memory 28 are local to the testers 18a . . . 18n. The local communication channel 32 between the active memory 22 and the buffer memory 28 can transfer the parameters included in test recipes significantly faster than the speed at which the same parameters can be communicated over the network 20 to the testers 18a . . . 18n.

Figure 2:
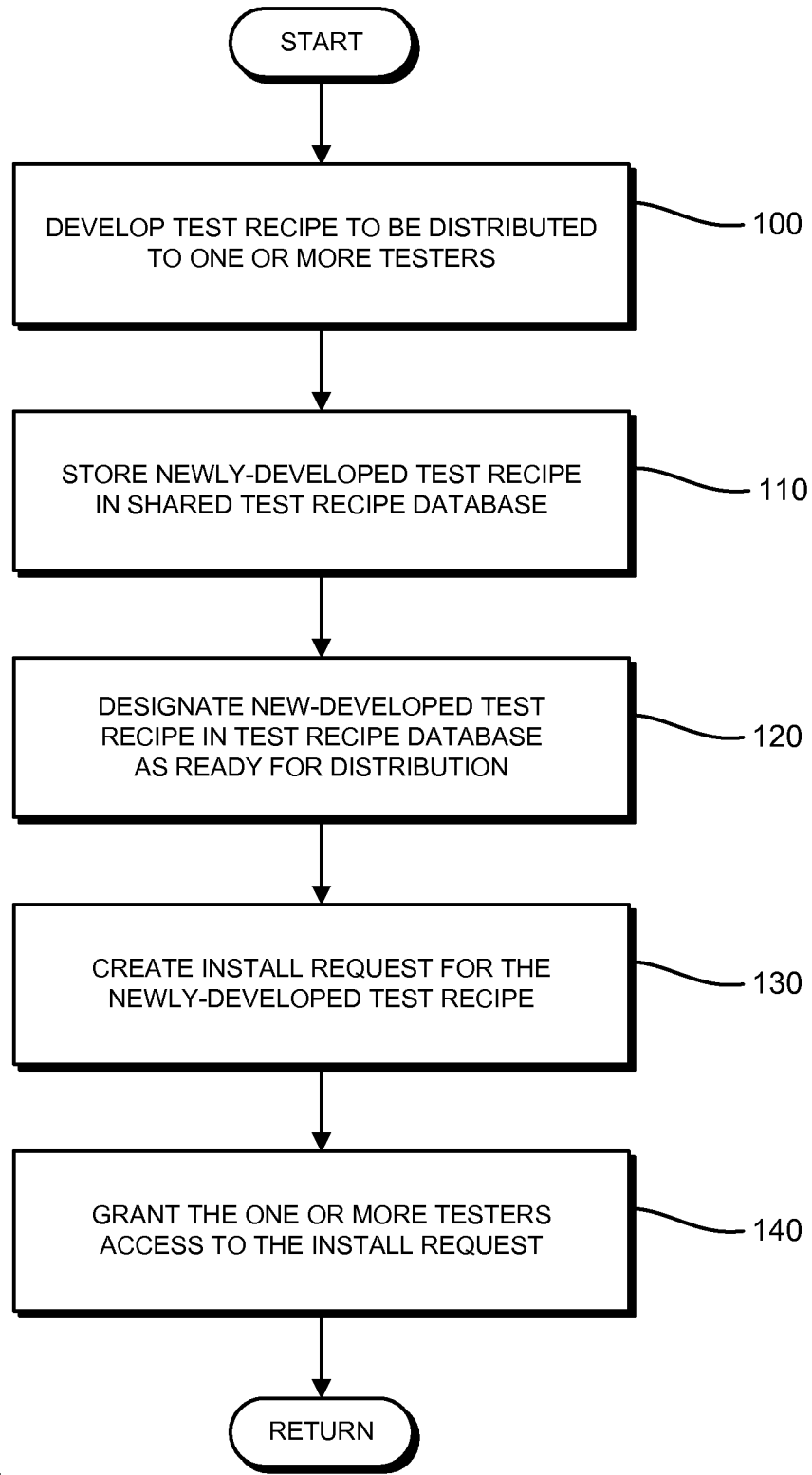
FIG. 2 is a flow diagram graphically depicting a method of presenting a newly-developed test recipe for distribution according to an illustrative embodiment of the present invention.
Figure 3:
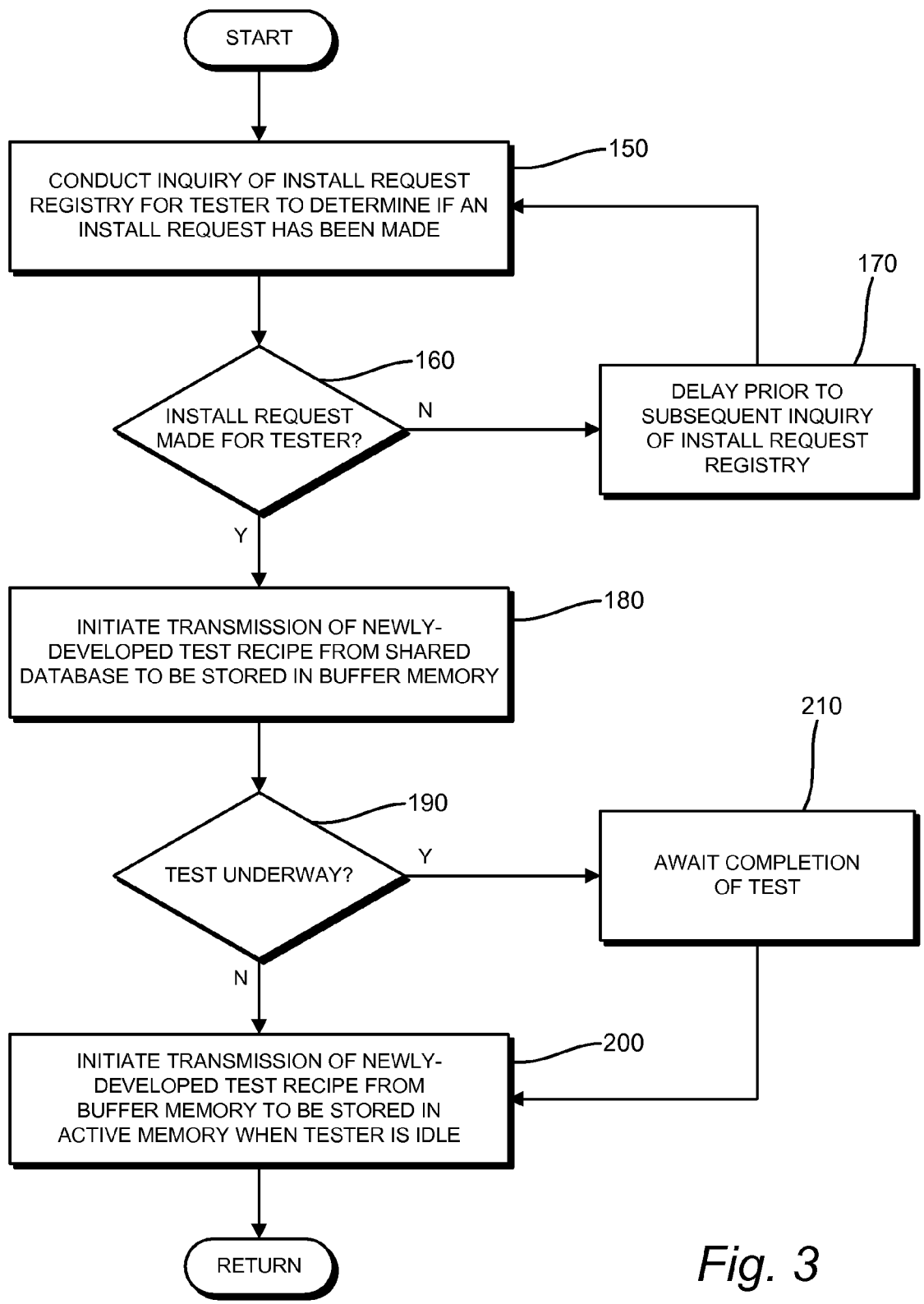
FIG. 3 is a flow diagram graphically depicting a method of storing a newly-developed test recipe in an active memory of a tester according to an illustrative embodiment of the present invention.

Creation of a newly-developed test recipe and communicating same to one or more of the testers 18a . . . 18n while minimizing disruptions of production can be understood with reference to the flow diagrams of FIGS. 2 and 3. For clarity, distribution of a newly-developed test recipe will be described with reference to one tester 18a, but it is understood that a plurality of networked testers 18a . . . 18n can optionally be updated in an analogous manner. A first parameter is stored in the active memory 22 at step 100 to govern the test to be conducted by the tester 18a. When a test of a DUT is initiated by the tester 18a, that test is conducted pursuant to the first parameter and other computer-readable instructions of what will be referred to as the active test recipe stored in the active memory 22 when the test is initiated. The "active test recipe" is simply the test recipe stored in the active memory 22 at a time when a test of a DUT is initiated by the tester 18a. While the test is underway, or while at least a portion of the test once it is underway, the active memory 22 is accessed by the tester 18a . . . 18n to retrieve at least the parameter of the test recipe and enable the controller of the tester 18a . . . 18n to execute the computer-executable instructions in performing the test. The active memory 22 can also optionally be utilized for testing purposes such as storing the results of the test as the results become available, or the test results can be stored in a separate memory component. Thus, a newly-developed test recipe is unable to be stored in the active memory 22 at this time as doing so could cause the tester 18a . . . 18n to operate erratically, make incorrect measurements, or otherwise deviate from the test recipe.

A newly-developed test recipe 34 (also referred to as the second test recipe 34) for a new test to be conducted by the tester 18a, or to update an existing test to be conducted by the tester 18a can be developed at the development workstation 12 at step 100 of FIG. 2. Once development of the second test recipe is complete it can optionally be compiled at any point within the process of transferring the second test recipe 34 in the active memory 22 of tester 18a. The second test recipe 34 can be transmitted over the network 16 and stored in the shared test recipe database 24 on the file server 14 at step 110. From the shared test recipe database 24 the tester 18a and other testers in communication with the file server 14 can access and retrieve the second test recipe 34 to be stored in the active memory 22 of each respective tester 18a . . . 18n.

The second test recipe 34 can optionally be stored in the test recipe database 24 before it is ready to be stored in the active memory 22 of the tester 18a (i.e., before a test of a DUT is to be conducted according to the parameters of that second test recipe 34). To distinguish the second test recipe 34 in such circumstances from other test recipes in the test recipe database 24 that are ready to be transmitted to the active memory 22 of the tester 18a, test recipes can be labeled or otherwise flagged as "ready for distribution" or "not ready for distribution." For example, if multiple versions of the second test recipe 34 exist in the test recipe database 24, then the version flagged as "ready for distribution" will identify the version of the second test recipe 34 according to which a test of the DUT is to be conducted when stored in the active memory 22 of the tester 18a. Accordingly, when the second test recipe 34 is complete, and ready to be stored in the active memory 22 of the tester 18a, it is designated as being ready for distribution at step 120.

Once the second recipe 34 is designated as being ready for distribution to the tester 18a, an install request 36 (FIG. 1) is created at step 130 of FIG. 2, and transmitted over the network 16 to be stored in a request queue 26a for the tester 18a on the file server 14 at step 140. The request queue 26a can be a file folder storing the install request 36, a list or text file including a link to, or at least a location where the second test recipe 34 designated as being ready for distribution in the test recipe database 24 can be retrieved, or other suitable location on the file server 14 or other such resource shared over at least one network 16, 20. The install request, when referenced by the tester 18a, informs the tester 18a that the second test recipe 34 is ready to be stored in the active memory 22 of the tester 18a, and where to find it. Referencing an install request to identify the second test recipe to be retrieved can optionally be performed in response to a user input, such as when the user placed the newly-developed test recipe 34 in database 24. In response to said referencing, the second test recipe identified in the install request can be retrieved by the tester 18a as described below.

The method described with reference to FIG. 2 illustrates the development side of the overall method of transmitting a test recipe to the active memory 22 of the tester 18a. FIG. 3, however, describes the portions of the method that can be initiated by the tester 18a, or observed from the tester 18a point of view, although other network members can optionally initiate one or more of these portions of the method instead.

As shown in FIG. 3, the microprocessor or other controller provided to the tester 18a conducts an inquiry of the request queue 26a at step 150 for any install requests issued from any of the one or more development workstation 12. The inquiry of the request queue 26a can be conducted while a test is being conducted by the tester 18a. At step 160, the controller of the tester 18a analyzes the results of the inquiry made of the request queue 26a and determines whether there are any outstanding install requests 36 for the tester 18a. If there are no outstanding install requests 36 in the request queue 26a the tester 18a waits at step 170 before conducting any subsequent inquiries are conducted of the request queue 26a back at step 150. The inquiry of the request queue 26a by the tester 18a can be performed occasionally, and optionally periodically at regular intervals. Like the inquiries, the decision at step 160 and delay can each optionally be conducted even while a test is being conducted by the tester 18*a* on a DUT.

If, on the other hand, an install request for the second test recipe 34 is found in the request queue 26*a* at step 160, then the tester 18*a* or any other networked component such as the file server 14 or development workstation 12, for example, can initiate transmission of the second test recipe 34 from the test recipe database 24 over the network 20 to the tester 18*a* to be stored in the buffer memory 28 at step 180. As mentioned above, the install request in the request queue 26*a* includes information where the tester 18*a* can find the second test recipe 34 to be retrieved in response to the install request. The second test recipe 34 is stored in the buffer memory 28 upon being received from the remote test recipe database 24 over the network 20. Once the second test recipe 34 is received by the tester 18*a* it is considered to be locally stored. Again, transmission of the second test recipe 34 over the network 20 to be received by the tester 18*a*, and storage of the second test recipe 34 can optionally be performed while a test of a DUT by the tester 18*a* is underway.

After storage of the second test recipe 34 in the buffer memory 28 has commenced a check of the tester 18*a* determines whether a test of a DUT is underway at step 190. As mentioned above, storing the second test recipe 34 in the active memory 22 is not performed while the tester 18*a* is conducting a test on a DUT since the active memory 22 is busy. If the answer to the decision at step 190 is in the affirmative, then completion of the test being performed by the tester 18*a* is awaited at step 210 before initiating communication of the second test recipe 34 from the buffer memory 28 to be stored in the active memory 22. If it is determined at step 190 that a test is not underway, then transmission of the second test recipe 34 from the buffer memory 28 is initiated at step 200. The second test recipe 34 is transmitted from the buffer memory 28 over a high-speed communication channel 32 to be stored in the active memory 22. The time required to communicate the second test recipe 34 from the buffer memory 28 to the active memory 22 is significantly less than the time required to communicate the second test recipe 34 from the test recipe database 24 to the buffer memory 28.

Once the second test recipe 34 is stored in the active memory 22, a subsequent test of a DUT initiated by the tester 18 can be performed in accordance with one or more parameters included in that second test recipe 34 stored in the active memory 22 when the subsequent test is initiated. Once the second test recipe 34, or at least the parameter of the second test recipe 34 is stored in the active memory 34, it becomes available to be accessed by the tester 18*a* to carry out the test according to that second test recipe 34. The subsequent test does not necessarily have to be the very next test conducted by the tester 18*a*, and the very next test conducted by the tester 18*a* does not necessarily have to be conducted according to the second test recipe 34. The tester 18*a* is merely equipped to conduct a test according to a parameter defined in the second test recipe 34.

Occasionally, the inquiry of the request queue 26*a* at step 150 will reveal a plurality of newly-developed test recipes to be received and stored in the buffer memory 28 of the tester 18*a* before being stored in the active memory 22. In response to identifying a plurality of newly-developed test recipes to be stored in the active memory 22 of the tester 18*a*, transmission of each of the newly-developed test recipes identified in the request queue 26*a* can be initiated in any desired order. For example, each newly-developed test recipe 34 in the install request 36 found in the request queue 26*a* can be transmitted at step 180 in order such that the tester 18*a* receives the plurality of newly-developed test recipes 34 in the same order that each of the newly-developed test recipes 34 was added to the install request 36 and/or the request queue 26*a*. According to other embodiments, the plurality of additional test recipes 34 identified in the install request 36 stored in the request queue 26*a* can be transmitted in order based on a priority assigned to each of the newly-developed test recipes 34, with the highest priority test recipes 34 being transmitted ahead of the lowest priority test recipes 34. The plurality of additional test recipes 34 can optionally be transmitted in the order in which each additional test recipe was released for transmission to the testers 18*a* . . . 18*n* by the developers according to alternate embodiments.

Regardless of the number of newly-developed test recipes 34 included in an install request, each of the newly-developed test recipes 34 identified in the install request 36 can be marked as "Complete", removed from the request queue 26*a*, or otherwise identified as having been performed when each newly-developed test recipe 34 is stored in the buffer memory 28, the active memory 22, or both. When so marked, removed or otherwise identified, the tester 18*a* will recognize upon subsequent inquiry of the request queue 26*a* that the newly-developed test recipe 34 corresponding to that install request has been transmitted to the tester 18*a*, and stored in the buffer memory 28, the active memory 22, or both.

According to other embodiments, when a plurality of newly-developed test recipes 34 are to be transmitted and stored locally in the active memory 22 of the tester 18*a*, transmission of every newly-developed test recipe 34 over the network 20 to be stored in the buffer memory 28 may not be complete by the time the tester 18*a* is to conduct a new test of a DUT. In such circumstances, when transmission of a newly-developed test recipe 34 over the network 20 to be stored in the buffer memory 28 is underway when the tester 18*a* is idled between tests, this transmission continues until the test recipe 34 being transmitted is completed. Once transmission of the test recipe 34 that was already underway when the tester 18*a* became idled has been completed, and before transmission of another newly-developed test recipe 34 is commenced, transmission of the newly-developed test recipes 34 over the network 20 to be stored in the buffer memory 28 is paused. Each newly-developed test recipe 34 that is completely stored in the buffer memory 28 at this moment is to be transmitted from the buffer memory 28 and stored in the active memory 22 before the new test by the tester 18*a* is initiated.

After the test recipes 34 are transmitted from the buffer memory 28 and stored in the active memory 22, transmission of the remaining newly-developed test recipes 34 from the test recipe database 24 over the network 20 to be stored in the buffer memory 28 can be resumed, even while the new test being performed by the tester 18 on the DUT is underway. When the new test of the DUT is complete, or when the active memory 22 otherwise becomes available for the newly-developed test recipes 34 to be stored therein, then communication of any additional test recipes 34 over the network 20 to be stored in the buffer memory 28 can again be paused, and communication of the remaining newly-developed test recipes 34 stored in the buffer memory 28 to be stored in the active memory 22 can be initiated. Although the newly-developed test recipes 34 are described as being transmitted form the test recipe database 24 to the testers 18*a* . . . 18*n*, other embodiments have the newly-developed test recipes 34 being transmitted from the networked development workstations 12 to the testers 18*a* . . . 18*n*, or from any other suitable computer-readable memory to the testers 18*a* . . . 18*n*.

According to other embodiments, if use of the remaining newly-developed test recipes 34 yet to be transmitted over the network 20 and stored in the buffer memory 28 is desired before the subsequent test is to be conducted by the tester 18, such as when the remaining test recipes 34 are of a high enough priority for example, then the new test to be conducted of the DUT by the tester 18a can be delayed until all of the remaining test recipes 34 are stored in the active memory 22 of the tester 18a. For example, if a newly-developed test recipe 34 is required to conduct a new test that must be conducted during the new test of the DUT, then the new test will not be initiated until the required newly-developed test recipe 34 is transmitted over the network 20 and eventually stored in the active memory 22. For some embodiments, the new test will be delayed until all of the newly-developed test recipes 34 in the request queue 26a are stored in the active memory 22. The different modes where subsequent testing is delayed until transmission of all of the plurality of newly-developed test recipes 34 to the testers 18a . . . 18n can be completed, or where testing is resumed prior to completion of said transmission can optionally be manually selected.

Either or both of the buffer memory 28 and the active memory 22 can optionally store all of the test recipes, including previous versions of updated test recipes, in addition to the newly-developed test recipes 34. According to other embodiments, the test recipes stored by the buffer memory 28 can optionally be deleted from the buffer memory 28 when the test recipes are transmitted to be stored in the active memory 22.

Additionally, the buffer memory 28 and the active memory 22 have been described above as having fixed functions. However, according to alternate embodiments, a logic pointer or other suitable selection device can change the memory component that acts as the active memory 22. For example, if a test is being conducted according to a test recipe in the active memory 22 and the buffer memory 28 now stores a newly-developed test recipe 34, when the first test is over the pointer can merely be switched to initiate a subsequent test according to the newly-developed test recipe in the buffer memory 28. This, in a sense, inverts the function of the buffer and active memories for the subsequent test.

Illustrative embodiments have been described, hereinabove. It will be apparent to those skilled in the art that the above devices and methods may incorporate changes and modifications without departing from the general scope of this invention. It is intended to include all such modifications and alterations within the scope of the present invention.

What is claimed is:

1. A method of distributing a test recipe to a tester that conducts a test to determine if a device under test operates as designed, the method comprising:
storing an active test recipe in an active memory in local communication with the tester, said active memory being located within said tester;
initiating the test of the device under test to be performed by the tester according to a parameter included in the active test recipe stored in the active memory;
receiving a second parameter included in a second test recipe while conducting the test of the device under test according to the parameter included in the active test recipe, wherein receiving the second parameter included in the second test recipe comprises:
referencing an install request to identify the second test recipe to be retrieved; and
in response to said referencing, retrieving the second test recipe identified in the install request;
storing the second parameter in a buffer memory in local communication with the active memory, said buffer memory being within said tester;
initiating a transfer of the second parameter from the buffer memory to the active memory; and
after initiation of the transfer of the second parameter to the active memory, initiating a subsequent test to be performed by the tester according to the second parameter included in the second test recipe.

2. The method according to claim 1 further comprising:
referencing an install request to identify a plurality of additional test recipes to be retrieved and stored in the buffer memory before being stored in the active memory; and
in response to said referencing, retrieving the plurality of additional test recipes identified in the install request in a predetermined order.

3. The method according to claim 2, wherein the predetermined order is based on at least one of: a priority assigned to each of the plurality of additional test recipes, and an order in which each of the test recipes were designated to be stored in the active memory, and an order that in which each of the test recipes were released to be transmitted to the tester.

4. The method according to claim 2 further comprising marking each of the plurality of additional test recipes identified in the install request stored in the buffer memory as being received.

5. The method according to claim 1 further comprising delaying the initiating of the subsequent test until the transfer of the second parameter to the active memory is complete.

6. The method according to claim 1 further comprising marking the second test recipe as being retrieved in the install request when the second parameter is stored in the buffer memory.

7. The method according to claim 1, wherein referencing the install request occurs at regular intervals.

8. The method according to claim 1, wherein referencing the install request occurs in response to input from a user.

9. The method according to claim 1 further comprising compiling the second test recipe after storing the second test recipe in the buffer memory.

10. The method according to claim 1, wherein initiating the transfer of the second parameter from the buffer memory to the active memory occurs subsequent to completion of the test of the device under test conducted according to the parameter included in the active test recipe.

11. A computer-readable medium storing computer-executable instructions for performing the method of claim 1.

12. A method of distributing a test recipe to a tester that conducts a test to determine if a device under test operates as designed, the method comprising:
storing an active test recipe in an active memory in local communication with the tester, said active memory being located within said tester;
initiating the test of the device under test to be performed by the tester according to a parameter included in the active test recipe stored in the active memory;
receiving a second parameter included in a second test recipe while conducting the test of the device under test according to the parameter included in the active test recipe;
referencing an install request to identify a plurality of additional test recipes to be received and stored in the buffer memory before being stored in the active memory; and
in response to said referencing, receiving the plurality of additional test recipes identified in the install request in order based on when each of the plurality of additional test recipes was added to the install request;

storing the second parameter in a buffer memory in local communication with the active memory, said buffer memory being within said tester;

initiating a transfer of the second parameter from the buffer memory to the active memory; and after initiation of the transfer of the second parameter to the active memory, initiating a subsequent test to be performed by the tester according to the second parameter included in the second test recipe.

13. The method according to claim 12 further comprising marking each of the plurality of additional test recipes identified in the install request stored in the buffer memory as being received.

* * * * *